United States Patent [19]

Karlsten et al.

[11] Patent Number: 4,988,846

[45] Date of Patent: Jan. 29, 1991

[54] CONTACT TIP FOR ARC WELDING APPARATUS

[75] Inventors: Karl-Ola Karlsten, Örebro; Bertil Larsson, Laxå, both of Sweden

[73] Assignee: ESAB Aktiebolag, Gothenburg, Sweden

[21] Appl. No.: 489,475

[22] Filed: Mar. 5, 1990

[30] Foreign Application Priority Data

Mar. 7, 1989 [SE] Sweden ................................ 8900781

[51] Int. Cl.⁵ .............................................. B23K 9/26
[52] U.S. Cl. ............................... 219/137.61; 219/136
[58] Field of Search ...................... 219/137.61, 137.44, 219/136

[56] References Cited

U.S. PATENT DOCUMENTS

| | | | |
|---|---|---|---|
| 1,959,180 | 5/1934 | Stevens | 219/8 |
| 2,366,068 | 12/1944 | Sohn | 219/136 |
| 3,112,393 | 11/1963 | Manz et al. | 219/137.44 |
| 3,116,408 | 12/1963 | Turbett et al. | 219/137.61 |
| 3,142,746 | 7/1964 | Schmerling | 219/137.61 |
| 4,733,052 | 3/1988 | Nilsson et al. | 219/137.61 |

FOREIGN PATENT DOCUMENTS 440617 8/1985 Sweden .
2074069 10/1981 United Kingdom .

*Primary Examiner*—Clifford C. Shaw
*Attorney, Agent, or Firm*—Nils H. Ljungman

[57] ABSTRACT

A contact nozzle for a wire-shaped welding electrode for arc welding is designed as a contact tube in the front section and as a guide channel for the electrode in the rear section. The guide channel is formed by an open groove made in the nozzle body. The feed by the electrode is hindered in the rectilinear feed direction by a convex projection of the groove wall. Particles, dragged into the nozzle with the electrode, fall out of the open groove and therefore cannot displace the contact tube.

19 Claims, 2 Drawing Sheets

CONTACT TIP FOR ARC WELDING APPARATUS

BACKGROUND OF THE INVENTION

1. Field of the Invention:

The invention relates to a contact tip for a wire-shaped welding electrode, whose front part is designed as a contact tube and whose rear part is designed as a guide channel, the channel walls having at least one projection which constitutes an obstacle to a rectilinear feed of the electrode through the contact tip or nozzle.

Nozzles or tips of this type are used, for example, for welding torches and welding guns. The welding current is transferred in the nozzle to the wire-shaped welding electrode, which is unwound essentially, continuously, from a coil and fed through the nozzle. It is, therefore, very important that very good contact is made between the electrode wire and nozzle. In addition, it is desirable, during welding, for the position of the points in contact with the electrode in the nozzle to remain unchanged and for the welding current to always flow through an essentially uniform electrode length between nozzle and electrode tip.

However, if there is poor contact between nozzle and electrode, spark erosion occurs having an adverse effect on the life of the nozzle. The formation of sparks, on account of the relatively high voltage drop, also causes greater heating of the nozzle, which is likewise disadvantageous.

2. Background Information:

Swedish Patent Publication No. 440,617 has disclosed a contact nozzle of the generic category described above. In a section of the known nozzle, the electrode is pushed out of the rectilinear feed path by projections in the nozzle wall and thereby forced into contact with the nozzle wall at accurately defined locations.

The known nozzle is essentially tubular. There is the risk that particles dragged along by the electrode will collect at the channel restrictions caused by the projections and lead to obstructions in the nozzle which will uncontrollably slow down the feed of the electrode.

In the U.S. Pat. No. 3,112,393, a tubular contact nozzle is described with a helix-shaped passage for the electrode. Continuous electrical contact between the electrode and the inner wall of the nozzle is established throughout the length of the nozzle. The manufacture of this nozzle, which starts from a tube with small bore, is quite complicated and therefore costly.

Electrodes are often treated with a protective coating to prevent oxidation and deterioration. Moreover, the surface of the electrode may become contaminated with dust and other deleterious substances as, for example, abrased material from the electrode guides. These materials may constrict the narrow bore of a tubular contact nozzle and prohibit a uniform advancement of the electrode.

OBJECT OF THE INVENTION

Therefore, the object of the invention is to create a nozzle which does not have the disadvantages referred to above and, in addition, can be manufactured very inexpensively. The invention is characterized in that the guide channel is at least partly made from a groove in the nozzle. In the guide channel, a projection is formed by a convex surface of the groove wall. Particles brought into the nozzle by the electrode or filler will preferably fall out of the open groove and therefore, usually, do not interfere with the feed of the electrode.

SUMMARY OF THE INVENTION

In an advantageous embodiment of the invention, the rear end of the guide channel is preferably designed as a tube or cylindrical cylindrical hole with a chamber and longitudinal axis coaxial with the longitudinal axis of the contact tube. This configuration facilitates insertion of the electrode into the nozzle.

In the present invention, any contaminating material which is fed to the contact tip together with the electrode usually falls radially out from the contact tip and will not usually disturb the advancement of the electrode.

One aspect of the invention resides broadly in a contact tip for use in arc welding devices, said contact tip comprising structure having at least one groove on a side thereof, said structure having means for passing therealong and making contact with a wire electrode and for supplying welding current to said wire electrode; said means for passing comprising a guide channel; said at least one groove having at least one substantially convex surface projecting into the guide channel and said groove forming at least a portion of said guide channel.

Further advantageous developments of the invention are described in connection with the attached drawings, which show an exemplary embodiment of the invention.

DESCRIPTION OF THE PREFERRED EMBODIMENT

Figure 1:
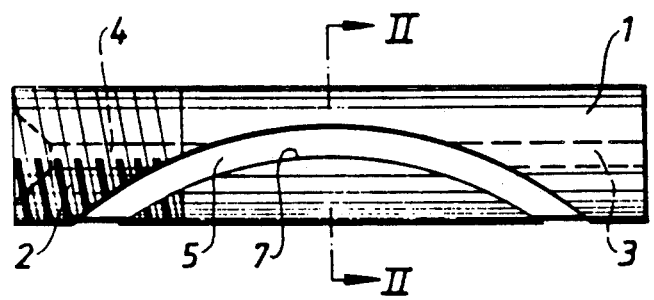
FIG. 1 is a plan view of a contact nozzle.
Figure 2:
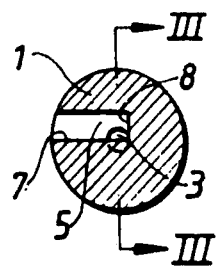
FIG. 2 is a section along II—II in FIG. 1.

The contact nozzle has the shape of a cylindrical metal bar or rod 1 which is preferably made of copper or a copper alloy, such as one typically used to fabricate contact nozzles or tips. Provided at the rear end of the bar is a screw thread 2 with which the nozzle can be screwed, for example, in a known manner into an electrode conductor of a welding gun. The bar 1 is preferably provided with preferably cylindrical bores 3 and 4 at both ends. The diameter of the bore 3 is slightly larger than the electrode diameter, whereas the diameter of the bore 4 is somewhat larger still. That is, preferably, the bore 4 is somewhat larger than the bore 3. In addition, a groove 5 having a preferably circular-arc-shaped course and preferably a rectangular cross-section is formed into the bar preferably by milling. The axis of the circular arc, such as, a radial axis is preferably perpendicular to the longitudinal axis of the nozzle. This radial axis preferably comprises the bisector of the arc formed in the tip or bar 1. The groove 5 is disposed such that the bisector is preferably perpendicular to the longitudinal axis of the tip. This longitudinal axis is preferably disposed through the cylindrical bores 3 and 4.

In order to facilitate insertion of wire electrode into the nozzle the outer end of the bore 4 preferably has a countersunk portion.

Figure 3:
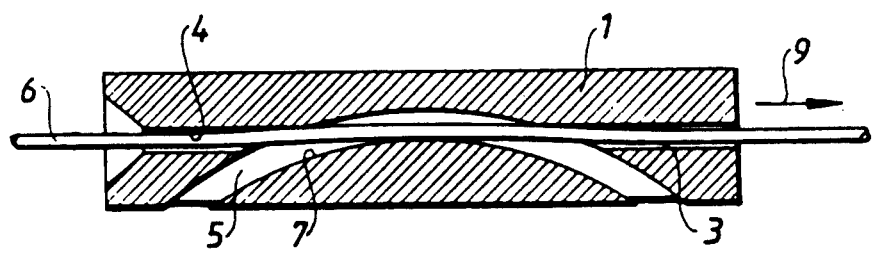
FIG. 3 is a section along III—III in FIG. 2.

A wire electrode 6 is additionally shown in the sectional view of FIG. 3. The feed direction of the electrode 6 through the nozzle is indicated by arrow 9. The wire electrode 6, which is inserted through the bore 4 serving as a guide tube, preferably in a rectilinear direction relative to the coaxial bore 3 serving as a contact tube, is deflected from this rectilinear feed direction by the convexly arched groove side wall 7 and then passed into the contact tube 3 returning to the original, rectilinear, direction. By the repeated deflection of the electrode in the nozzle, definite contact points are created between the electrode wire and the nozzle, the positions of which preferably do not change even after prolonged use of the nozzle. Particles dragged along by the electrode in the nozzle do not readily collect in the open groove, if at all, and therefore do not greatly impair the feed of the electrode through the nozzle. In order to correctly guide the electrode 6 in the area of the groove 5, a flat groove root 8 is formed as a tangential surface of the bore 3. This flat groove root 8 is shown vertically disposed in FIG. 3.

The nozzle is simple and inexpensive to produce from a piece of bar or cylindrical rod, for example by boring the two short bores 3 and 4 and milling the circular-arc-shaped groove 5. The convex curvature of the groove wall projecting in the rectilinear feed direction of the electrode can be fashioned in a variety of ways at the discretion of the manufacturer. For technical reasons related to manufacture, the circular-arc-shape groove shape proves to be particularly advantageous.

Figure 4:
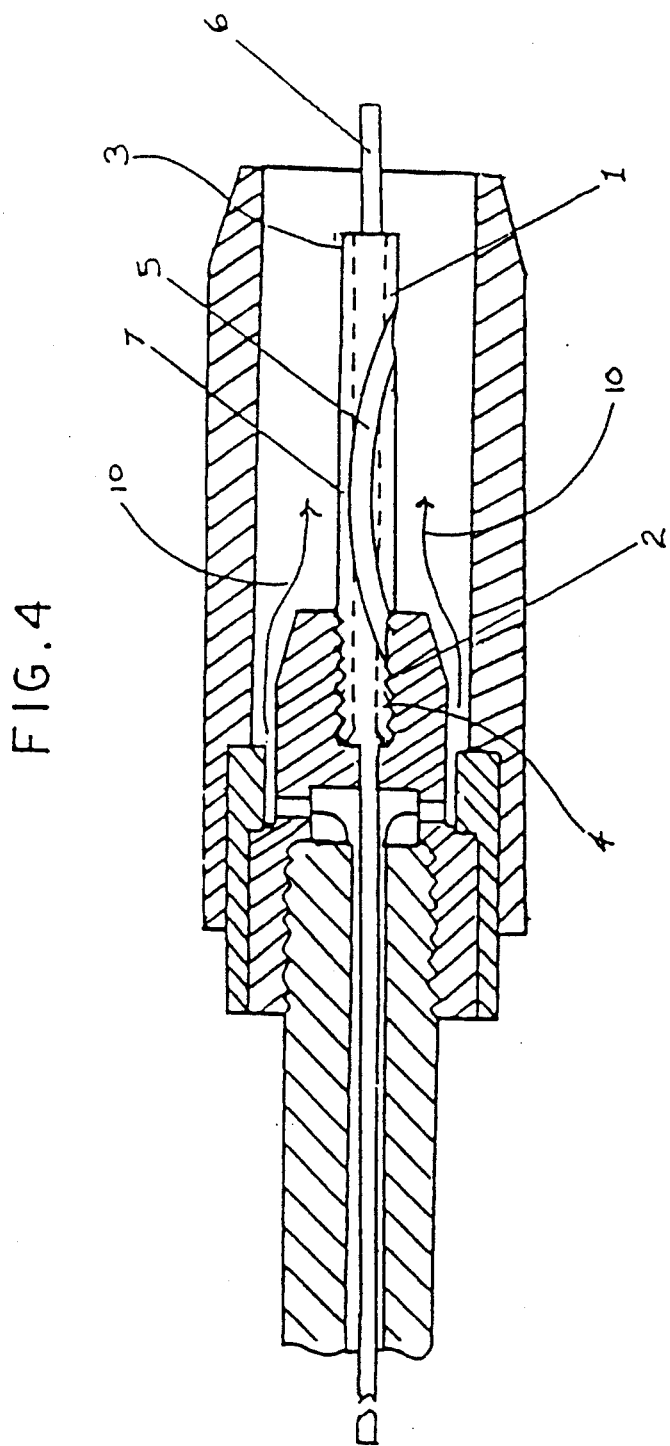
FIG. 4 shows the contact tip installed in a welding torch.

Now referring to FIG. 4, in some cases the flow of a shielding gas which surrounds the contact tip 1, as for example shown by the arrows 10, may conceivably be disturbed by the surface of the contact tip. The quality of the weld might, then, possibly but not likely be adversely affected. Since the speed of the gas flow through the nozzle of the welding torch is comparatively low, such disturbances can be normally discounted as they occur only occasionally, if at all. The bushing into which the contact or nozzle tip 1 is screwed may, preferably, only be used if significant gas flow is needed and very high demands must be met. Threads are provided on the contact tip 1 to facilitate the screwing thereof into the welding torch. Advantageously, a wear resistant layer may be deposited on the contact surface before inserting the tip into the bushing.

In summary, one feature of the invention resides broadly in a contact nozzle for a wire-shaped welding electrode for arc welding, whose front part is designed as a contact tube 3 and whose rear part is designed as a guide channel, the channel walls having at least one projection which constitutes an obstacle to a rectilinear feed of the electrode 6 through the contact nozzle, characterized in that the guide channel is at least partly a groove 5 made in the nozzle, the projection being formed by a convex surface 7 of the groove walls.

Another feature of the invention resides broadly in a contact nozzle which is characterized in that the rear end of the guide channel is designed as a guide tube 4 coaxial with the contact tube 3.

Yet another feature of the invention resides broadly in a contact nozzle which is characterized in that the groove root 8 is a tangential plane of the contact tube 3.

A further feature of the invention resides broadly in a contact nozzle which is characterized in that the course of the groove 5 in the contact nozzle has the shape of a circular arc whose axis is perpendicular to the axis of the contact tube 3.

A yet further feature of the invention resides broadly in a contact nozzle which is characterized in that the groove 5 has a rectangular cross-section.

In further summary, a contact nozzle for a wire-shaped welding electrode for arc welding is designed as a contact tube (3) in the front part and as a guide channel for the electrode in the rear part. The guide channel is formed by an open groove (5) made in the nozzle body. The feed by the electrode (6) is hindered in the rectilinear feed direction by a convex projection (7) of the groove wall. Particles dragged into the nozzle with the electrode preferably fall out of the open groove (5) and therefore usually cannot displace the contact tube (3).

An example of a contact tip welding electrode is found in U.S. Pat. No. 4,733,052 of the same title.

The contact nozzle of the present invention could be utilized as the nozzle tip 5 of the welding torch 10 in U.S. Pat. No. 4,733,052.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications and publications recited herein may be considered to be incorporable, at applicants option, into the claims during prosecution as further limitations in the claims to patentably distinguish any amended claims from any applied prior art.

The invention as described hereinabove in the context of the preferred embodiment is not to be taken as limited to all of the provided details thereof, since modifications and variations thereof may be made without departing from the spirit and scope of the invention.

What is claimed is:

1. A contact tip for use in arc welding devices, said contact tip comprising structure having at least one groove on a side thereof, said structure having means for passing therealong and making contact with a wire electrode and for supplying welding current to the wire electrode;

said means for passing comprising a guide channel said at least one groove having at least one substantially convex surface projecting into the guide channel; and a wall of said groove forming at least a portion of said guide channel.

2. A contact tip according to claim 1, wherein said guide channel comprises a first orifice for admission of the wire electrode on one end of the contact tip;

a second orifice for ejecting the wire electrode on another end of the contact tip;

said first and second orifices being substantially coaxially disposed with respect to one another.

3. A contact tip according to claim 2, wherein said first orifice is formed by a structure comprising at least partially a curved surface.

4. A contact tip according to claim 3, wherein said at least one groove comprises one groove, said one groove has a bottom portion, a part of which bottom portion is disposed wholly within said contact tip, said bottom portion having a portion being tangentially disposed with respect to at least a portion of said curved surface.

5. A contact tip according to claim 4, wherein said curved surface comprises a circular cylindrical surface.

6. A contact tip according to claim 1, wherein said at least one groove comprises one groove, said one groove defining a substantially circular path in said contact tip.

7. A contact tip according to claim 2, wherein said at least one groove comprises one groove, said one groove defining a circular path in said contact tip.

8. A contact tip according to claim 3, wherein said at least one groove comprises one groove, said one groove defining a circular path in said contact tip.

9. A contact tip according to claim 4, wherein said at least one groove comprises one groove, said one groove defining a substantially circular path in said contact tip.

10. A contact tip according to claim 5, wherein said circular path comprises an arc shaped path;
    said arc shaped path having a bisector which bisectors said arc shaped path of said groove;
    said guide channel having a substantially longitudinal axis: and
    said bisector being substantially perpendicular to said longitudinal axis.

11. A contact tip according to claim 9, wherein said circular path comprises an arc shaped path;
    said arc shaped path having a bisector;
    said guide channel having a longitudinal axis; and
    said bisector being substantially perpendicular to said longitudinal axis.

12. A contact tip according to claim 1, wherein said at least one groove has at least a portion with a substantially rectangular cross section.

13. A contact tip according to claim 2, wherein said at least one groove has a substantially rectangular cross section.

14. A contact tip according to claim 3, wherein said at least one groove has a substantially rectangular cross section.

15. A contact tip according to claim 4, wherein said groove has a substantially rectangular cross section.

16. A contact tip according to claim 5, wherein said groove has a substantially rectangular cross section.

17. A contact tip according to claim 9, wherein said groove has a substantially rectangular cross section.

18. A contact tip according to claim 10, wherein said groove has a substantially rectangular cross section.

19. A contact tip according to claim 11, wherein said groove has a substantially rectangular cross section open on one side:
    the convex surface of said one groove is disposed between said first and second orifices substantially in a middle portion of the contact tip;
    means for attaching said contact tip to welding apparatus:
    said tip having a substantially, circularly cylindrical outer shape:
    said groove extending greater than half way through said contact tip:
    means for facilitating insertion of a wire electrode into said guide channel of said contact tip;
    said first orifice comprising at least a portion of said guide channel: and
    said second orifice comprising a contact tube portion.

* * * * *